United States Patent [19]

Grandel et al.

[11] 4,335,860
[45] Jun. 22, 1982

[54] ELECTRIC HOUSEHOLD BLENDER WITH MOTOR ENABLED BY LID LOCKING

[75] Inventors: Johannes Grandel, Frankfurt am Main; Günther Falkenbach, Eschborn, both of Fed. Rep. of Germany

[73] Assignee: Braun AG, Frankfurt, Fed. Rep. of Germany

[21] Appl. No.: 117,332

[22] Filed: Jan. 31, 1980

[30] Foreign Application Priority Data

Feb. 7, 1979 [DE] Fed. Rep. of Germany ....... 2904498

[51] Int. Cl.³ .................... B02C 18/12; B02C 23/04
[52] U.S. Cl. ............................ 241/37.5; 241/282.1
[58] Field of Search ............ 241/36, 37.5, 92, 199.12, 241/282.1, 282.2

[56] References Cited

U.S. PATENT DOCUMENTS

| | | | |
|---|---|---|---|
| 3,612,126 | 10/1971 | Emmons et al. | 241/199.12 |
| 4,081,144 | 3/1978 | Bouillet | 241/37.5 |
| 4,095,499 | 6/1978 | Ades | 241/36 X |
| 4,174,073 | 11/1979 | Maher et al. | 241/37.5 X |
| 4,216,917 | 8/1980 | Clare et al. | 241/282.1 X |

Primary Examiner—Howard N. Goldberg
Attorney, Agent, or Firm—Sughrue, Mion, Zinn, Macpeak and Seas

[57] ABSTRACT

An electric household blender having a motor base 4 with an operating switch 27 and a mountable device 50 with rotating cutting tools 79. The device is held in place by lock bolts 8 coupled to the motor base, the lock bolts cooperating with lock bars 51 which can be moved longitudinally in the motor base and which, depending on the position of the lock bolts, release or lock the operating switch for turning the motor on and off.

5 Claims, 9 Drawing Figures

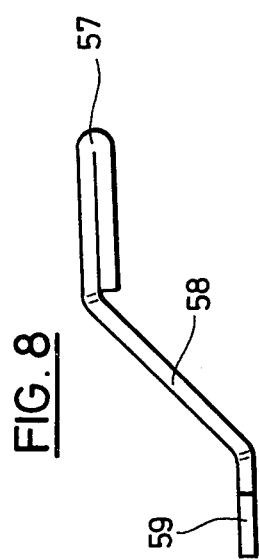
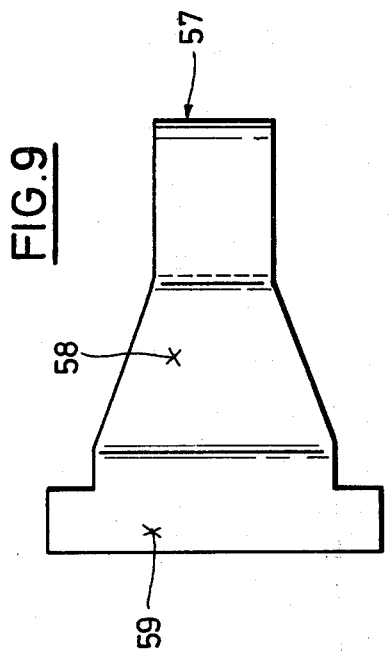
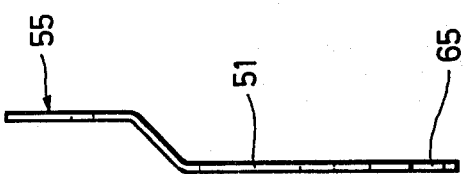
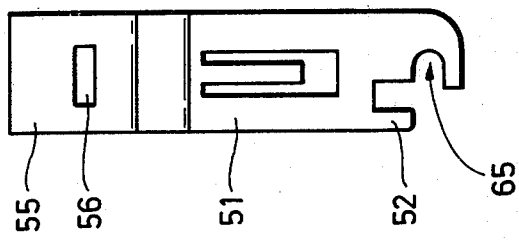

ELECTRIC HOUSEHOLD BLENDER WITH MOTOR ENABLED BY LID LOCKING

BACKGROUND OF THE INVENTION

This invention relates to an electric household or kitchen blender having means for disabling the drive motor switch unless the blender lid is protectively locked in an operative position.

In known devices of this type it often occurs, particularly when the material to be processed has a low density, that the motor continues to rotate for several seconds after being turned off. If the user is not careful and puts his hand into the jar too early before the blades are completely still, he may severely injure himself.

In order to protect the user of a household blender of this type from injury from blades which rotate after the motor is shut off, in accordance with the present invention, a jar holder having lock bolt supports is provided for holding the jar containing the material to be processed. This jar holder can be mounted on the motor base and locked thereon by means of a lock ring having lock bolts whereby the lock ring, which is held and guided in the motor base, can be rotated about the longitudinal axis of the motor base and moved by a lock bar which it further cooperates with. A lock rod can be moved longitudinally in the motor base, and releases or locks the operating switch for turning the motor on and off.

It has been shown, hwever, that where for example, a shredding device or food processor (i.e., a multiple element working device which has a planar mounting disc in place of a winged blade and which also has an eccentric filling support) is to be connected with the motor base instead of a jar with jar holder and winged blades which rotate in the jar, the free diameter remaining above the motor base for the tool, (such as the planar mounting disc) is too small for it to be effective because the diameter of the jar holder cannot be larger than the diameter of the motor base in the area of the locking device.

SUMMARY OF THE INVENTION

The present invention therefore has as an object the provision of an interlocking device in an electric household blender having a larger free diameter than a jar holder for a blender or mixer.

This object is achieved according to the invention in an interlocking device in which the lock bolt supports are bars which are truncated at the top and which are held and guided radially outward on the housing of the attachment, for example, a shredding device, and which can be moved perpendicularly against a spring force. The bars cooperate with lock levers which are tipably mounted in the housing of the apparatus with the free ends of the levers extending into openings in the side walls of the lid when the bars are pushed downward.

Preferably, the free ends of the lock levers are mounted on the apparatus so as to be pivotable about horizontal axes and cooperate with ribs in the lid of the apparatus. When the lid is pressed down, the ribs working in conjunction with the lock bars, puch the lock levers in the direction of closing. In a preferred embodiment, the ends of the lock levers are supported on ribs which are part of the apparatus and are also prevented from shifting laterally by projections on the housing.

There are a wide variety of possible embodiments of the invention. One such embodiment is illustrated schematically in the attached drawings.

BRIEF DESCRIPTION OF THE DRAWING

FIGS. 5, 6 and 7 are different views of the lock bar for holding the shredding device on the motor base; and FIGS. 8 and 9 are different views of the lock levers for locking the lid of the shredding device.

DETAILED DESCRIPTION OF THE PREFERRED EMBODIMENTS

Figure 1:
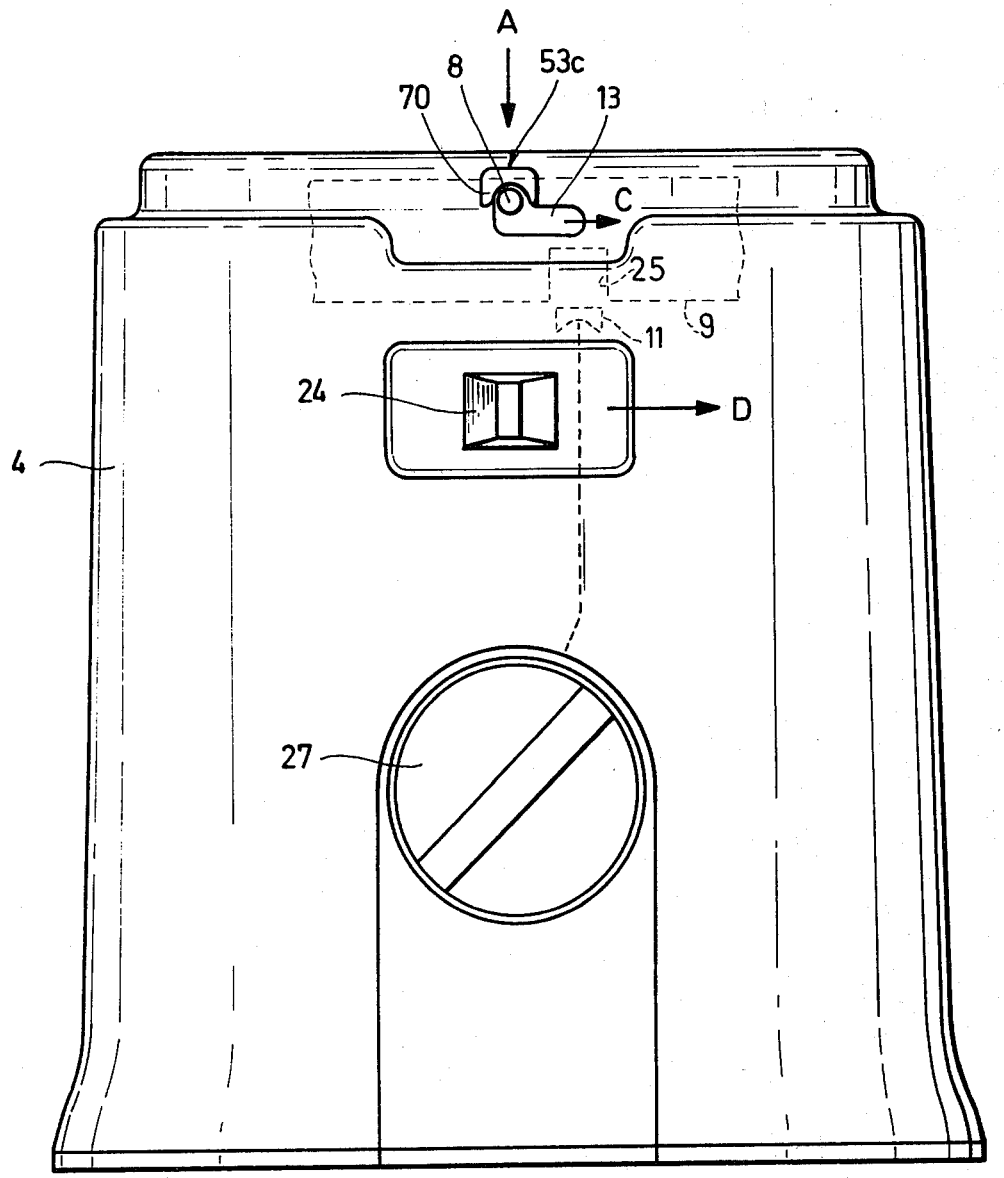
FIG. 1 is a front view of the motor base of a kitchen machine.
Figure 2:
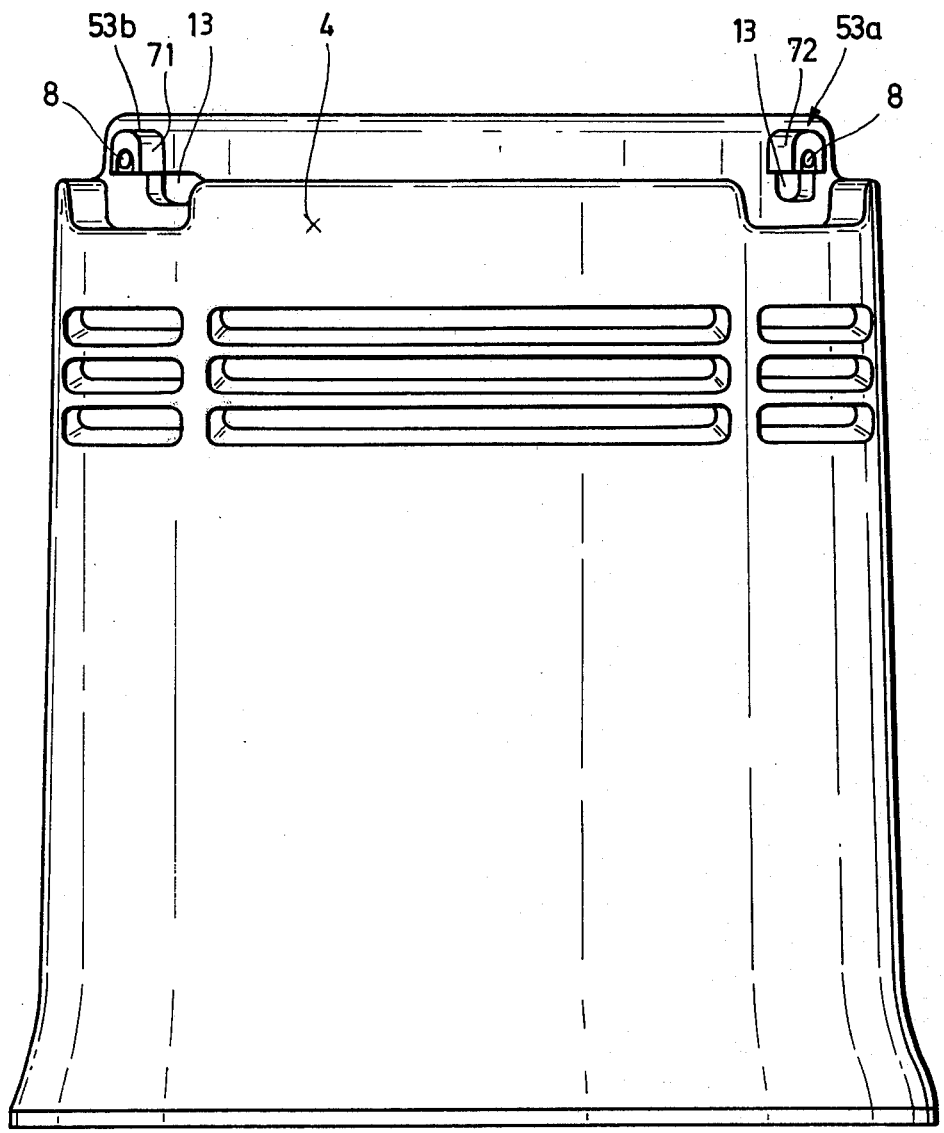
FIG. 2 is a back view of the motor base according to FIG. 1.

The motor base 4, in the area of its upper edge, has L-shaped slots 17a, 17b and 17c distributed arounds its circumference. Projecting radially outward through the L-shaped slots are lock bolts or bolts 8, which serve to lock the apparatus or mounting unit such as a shredding blender 50 onto the motor base 4. The lock bolts 8 are connected with an external slide 24 by means of a rotatable internal ring 9, whereby slide 24 moves the lock bolts 8 in the direction of arrow C (FIG. 1) when it is moved in the direction of arrow D.

Figure 3:
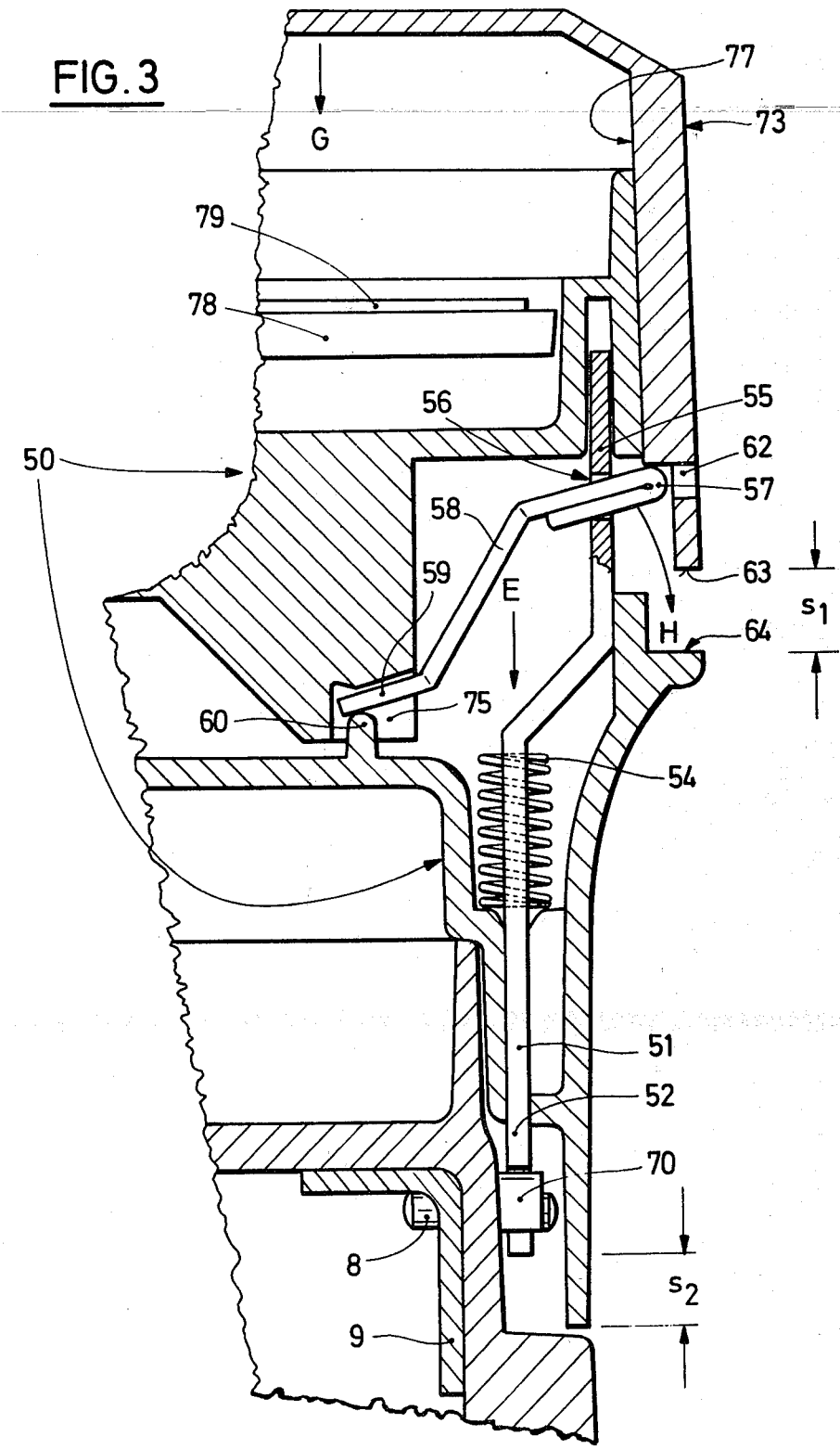
FIG. 3 is an enlarged illustration in partial section through the motor base with a mounted shredding device.
Figure 4:
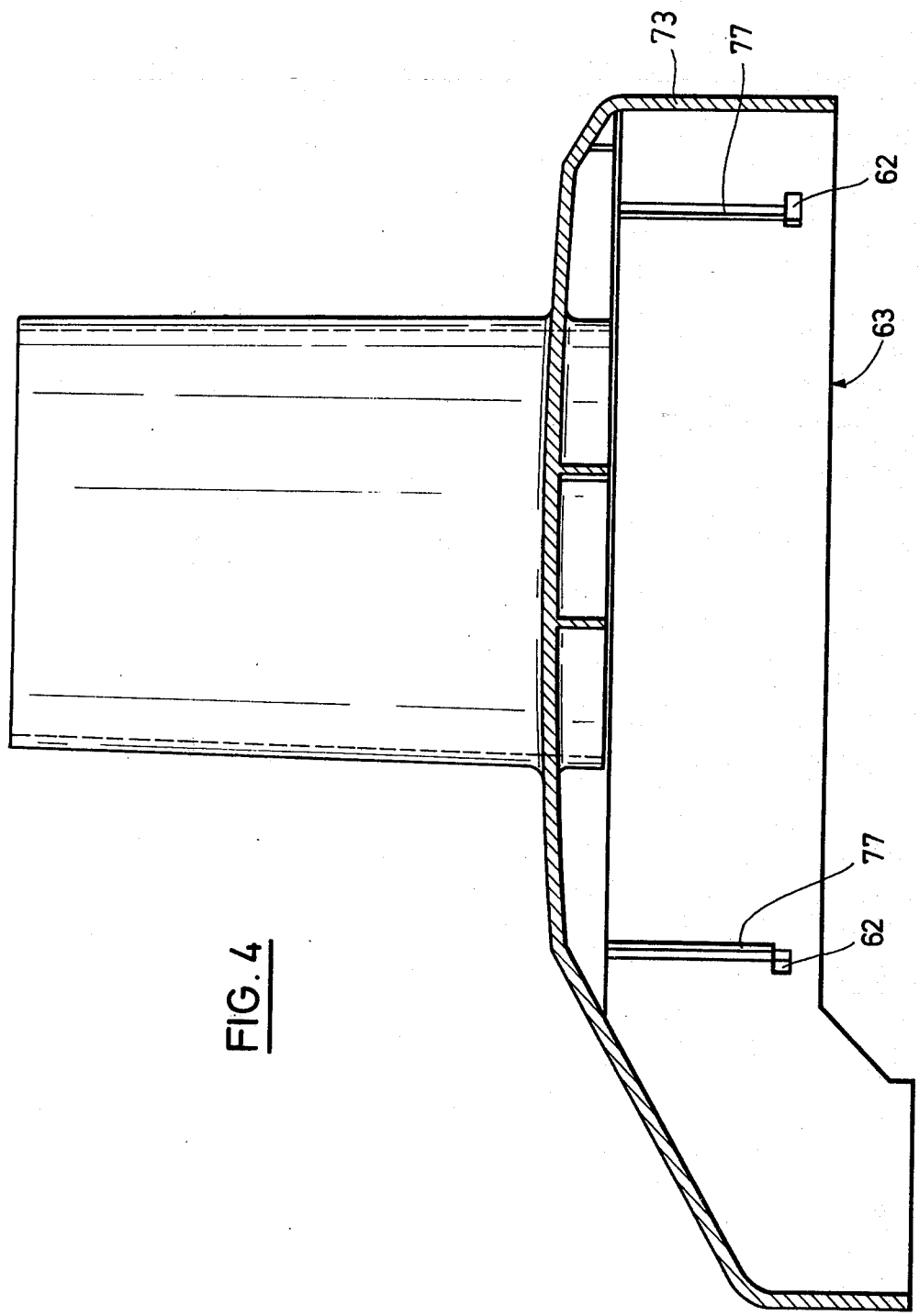
FIG. 4 is a longitudinal section of the lid of the shredding device according to FIG. 3.

In order that the lock bolts can be moved in the direction of arrow C, they must first be pushed downward (in the direction of arrow A), which takes place as the blender 50 is mounted, by means of three lock bars 51 mounted on the blender (FIG. 3).

Each lock bar 51 includes fingers 52 (FIG. 6) which move into guide slots 53a, 53b, 53c provided in guide studs 70, 71, 72 on the motor base 4, so that the lock bolts 8 can be pushed in the direction of arrow C (FIG. 1). Each of the three lock bars is held and guided in the housing of the blender so as to be capable of being moved against the force of a spring 54. As shown in FIGS. 3 and 6, each lock bar has an upper end 55 equipped with an opening 56, with which the free end 57 of a respective lock lever 58 is in engagement. The other end 59 of each lock lever is mounted in a recess 75 in the housing 50 of the blender so as to be capable of pivoting about a rib 60.

If the blender 50 is then operatively placed on the motor base 4 with the associated lid 73 and pressure is exerted in the direction of arrow G on the lid, the three lock levers 58 connected with the lock bars 51 are rotated about the ribs 60 in the direction of arrow H by the shoulders of ribs 77 of the lid, whereby the free ends 57 of the levers move into the openings 62 beneath the ribs such that a form-fitting connection of the lid with the blender 50 is attained by means of the lock levers. At the same time the lock levers 58 pivot in the direction of arrow H, they push the lock bars 51 in the direction of arrow E against the force of the springs 54 a distance $S_1$ until the lower edge 63 of the lid 73 abuts the collar 64 of the blender.

The three lock bars 51 thereby move almost the same distance $S_2$ and their fingers 52 engage in openings 53a, 53b, and 53c in the guide studs 70, 71, 72 on the motor base 4 and press the lock bolts 8 downward in the direction of arrow A. The three lock bolts 8 can then be circumferentially moved in unison in the direction of arrow C by moving the slide 24 in the direction of arrow D by means of the ring 9, which is mounted in the motor base 4. When this is done, the lock bolts 8 move in the vertical slots 17a, 17b and 17c and enter into the notches 65 at the lower ends of the lock bars 51 in such a manner that the lock bars and thereby the entire blender including the lid 73 is firmly held on the motor base 4.

The locking mechanism located in the motor base 4 is constructed in such a manner that the operating switch 27 for turning the motor on and off can only be rotated and activated when the slide 24 is moved in the direction of arrow D and the lock bolts 8 are simultaneously moved in the direction of arrow C. This is implemented by a vertically movable rod 11 slidably mounted within the motor base and cammed upwardly by the clockwise or "turn on" rotation of the operating switch 27. This rod can only be moved upwardly, however, when its top end lies just below a cutout or recess 25 in the ring 9, and this recess is only presented to the rod when the ring has been rotated to the extent of its travel by the slide 24. Complete protection against unintentionally contacting the cutting tool 79 or the friction disc 78 is provided in that all lock bolts 8 can only be moved by the slide 24 when the blender 50 with lid 73 is previously mounted on the motor base 4 and pushed downward against spring force. The motor can also not be turned on if only the blender without the lid is mounted, because then the lock levers 58 are not pivoted out of their original position.

What is claimed is:

1. An electric household blender comprising:
   (a) a motor bse (4) mounting a motor and an electrical operating switch (27) therefor;
   (b) a blender attachment (50) having a housing, rotating cutting tools and a removable lid (73), said attachment being mountable on the motor base such that said cutting tools may be driven by said motor;
   (c) a lock ring (9) provided with a plurality of outwardly extending lock pins (8), said lock ring being rotationally movable within said motor base about a longitudinal axis thereof and including means (25) for enabling the motor operating switch to be turned on and off;
   (d) a plurality of springs;
   (e) a plurality of lock pin supports (51) in the form of bars, the two ends of which are vertically disposed, said bars each having a center portion bent with respect to said ends, said lock pin supports being guided on said attachment housing and being vertically movable against the force of said springs; and
   (f) a plurality of lock levers (58) individually cooperating with said lock pin supports in a camming manner, said lock levers being mounted for pivotal movement about horizontal axes and having free ends (57) movable into openings (62) in said lid upon its depression, the depression of said lid camming said lock pin supports downwardly to enable the rotation of said lock ring and lock pins, whereby said operating switch may not be turned on to energize the motor and drive the cutting tools unless the blender attachment is properly mounted on the motor base and the lock ring is rotated.

2. An electric household blender according to claim 1, wherein the free ends of the lock levers cooperate with shouldered ribs (77) of the lid whereby the depression of the lid, together with the free ends of the lock levers, pushes the lock pin supports in a downward direction.

3. An electric household blender according to either claim 1 or 2, wherein the bars (51) have openings (56) in upwardly and outwardly projected ends (55) thereof, the openings (56) being engaged by the free ends (57) of the lock levers.

4. An electric household blender according to either claim 1 or 2, wherein the bars (51) have fingers (52) on their lower ends which engage in interlocking slots (53) provided in the motor base and notches (65) adjacent the fingers for receiving the lock pins.

5. An electric household blender according to either claim 1 or 2, wherein inner ends (59) of the lock levers are pivotally supported on ribs (60) of the apparatus and abut projections (75) of the apparatus to prevent their lateral movement.

* * * * *